Inventor
Saburo Uemura

Inventor
Saburo Uemura

Inventor
Saburo Uemura

Inventor
Saburo Uemura

United States Patent Office 3,514,537
Patented May 26, 1970

3,514,537

SYSTEM FOR THE MAGNETIC RECORDING OF DATA ON TAPE AND FOR THE SELECTIVE RETRIEVAL OF THE RECORDED DATA

Saburo Uemura, Kanagawa-ken, Japan, assignor to Sony Corporation, Tokyo, Japan, a corporation of Japan Filed Nov. 2, 1966, Ser. No. 591,596
Claims priority, application Japan, Nov. 4, 1965, 40/67,636
Int. Cl. H04n *5/78;* G11b *27/32*
U.S. Cl. 178—6.6 3 Claims

ABSTRACT OF THE DISCLOSURE

In a system for reproducing data recorded in tracks on a magnetic tape which are identified by index signals counted from a reference signal at one end or the other of the tape, the index signals are reproduced by two spaced heads during tape movement to provide out-of-phase outputs which can be discriminated as to the direction of tape movement, thereby to control the direction of counting, as well as the count, of a counting device operated by the reproduced index signals. Further, the index signals are of sine-wave configuration and the heads for reproducing the index signals are flux-sensitive to control the operation of a fine adjustment control by which a selected track is accurately aligned with the transducer for reproducing the data recorded therein.

This invention relates generally to a data retrieval system, and more particularly to a magnetic recording and reproducing system which permits the recording of a plurality of different bits or pieces of information and which permits virtually instantaneous reproduction of any specified piece or bit of information.

It is now well-known to utilize a magnetic recording and reproducing system to record and reproduce television signals, such a system being commonly referred to as a video tape recorder. In such prior art video tape recorders, the television signals are recorded and displayed in a specified series of frames and in a specified time relationship. That is, the recording and reproduction of the television video signals must be accomplished in a definite fixed time relationship. Since the advent of video tape recorders, there have been many prior art attempts to utilize such a system and selectively reproduce various bits or pieces of information, such as the contents of books, film, data figures and similar types of information.

In these prior art systems, each bit or piece of information was recorded in conjunction with a specified document signal, with each document signal being different in form and independent from any other document signals. It can therefore be seen that while television signals are recorded and displayed in a certain specified time relationship, that in a data retrieval system, each individual document or bit of information is displayed independently of time. In prior art data retrieval systems, since each page orbit of information is not related to any other page or bit of information the documents or specified pages or bits of information had to be located in a difficult and tedious manner.

In prior art data retrieval systems, as stated above, the identification signal for any particular document or bit of information is different from and not related to the identification signals for any other document or bit of information. The recording and reproduction of specified identification signals could therefore be accomplished irrespective of any time relationship. In prior art data retrieval system, accordingly, it has always been required that a specified doument or bit of information be recorded and reproduced in accordance with a specified identification signal which identification signal corresponded to only one specified document or bit of information.

In view of the foregoing, it is the primary object of the present invention to provide a data retrieval system in which each document or bit of information is recorded with an identification signal, which identification signal is always exactly the same as every other identification signal, but which will permit the retrieval and reproduction of specified documents or bits of information.

Another object of the present invention is to provide a data retrieval system which is simple to operate, is high in resolution and which is relatively inexpensive since it is not necessary to assign a different identifying signal or number to each document or bit of information.

A further object of the present invention is to provide a data retrieval system which easily and accurately permits the virtual instantaneous location and display of specified documents or bits of information.

Yet another object of the present invention is to provide a data retrieval system utilizing a magnetic recording and reproducing unit which facilitates the accurate and rapid retrieval and reproduction of any desired document or bit of information.

A still further object of the present invention is to provide a data retrieval system having a plurality of individual storing devices on which specific information can be stored for individual viewing at any time.

These and further objects, features and advantages of the present invention will appear from a reading of the following detailed description of one preferred embodiment of the invention which is to be read in conjunction with the accompanying drawings in which similar components in the various view are identified by the same reference numeral.

Briefly stated, the data retrieval system of the present invention utilizes a magnetic recording and reproducing system in which each page of a document or each bit of information, is recorded on a single track which extends obliquely across the width of the magnetic tape with respect to the lengthwise direction of movement of the magnetic tape.

Some indication is provided at the beginning of the magnetic tape to identify the first document page or bit of information recorded. This preliminary identification signal can either be recorded on the tape or provided in any other conventional manner.

During recording, each track which corresponds to one document page or bit of information has simultaneously recorded therewith an identifying signal. This identifying signal is identical for each track recorded on the tape. In addition, during recording each document page or bit of information is assigned a number, the number corresponding to the distance from the beginning of the tape, i.e. if 6,000 document pages or bits of information have been previously recorded, the next document page or bit of information would be assigned Number 6,001. During reproduction, an identification number is selected which corresponds to the identification number for the document page or bit of information which it is desired to retrieve or reproduce. The data retrieval system of the present invention then scans the magnetic tape either from the beginning or from the end and stops when it has counted the selected number of identification signals. The unit is then stopped and the selected track on the magnetic tape is scanned to reproduce the desired document page or bit of information. In the practice of the present invention recording and reproducing can be effected while the tape is held stationary. This accordingly reduces the likelihood of deteriorating the reproduced picture or of reducing resolution.

Figure 1:
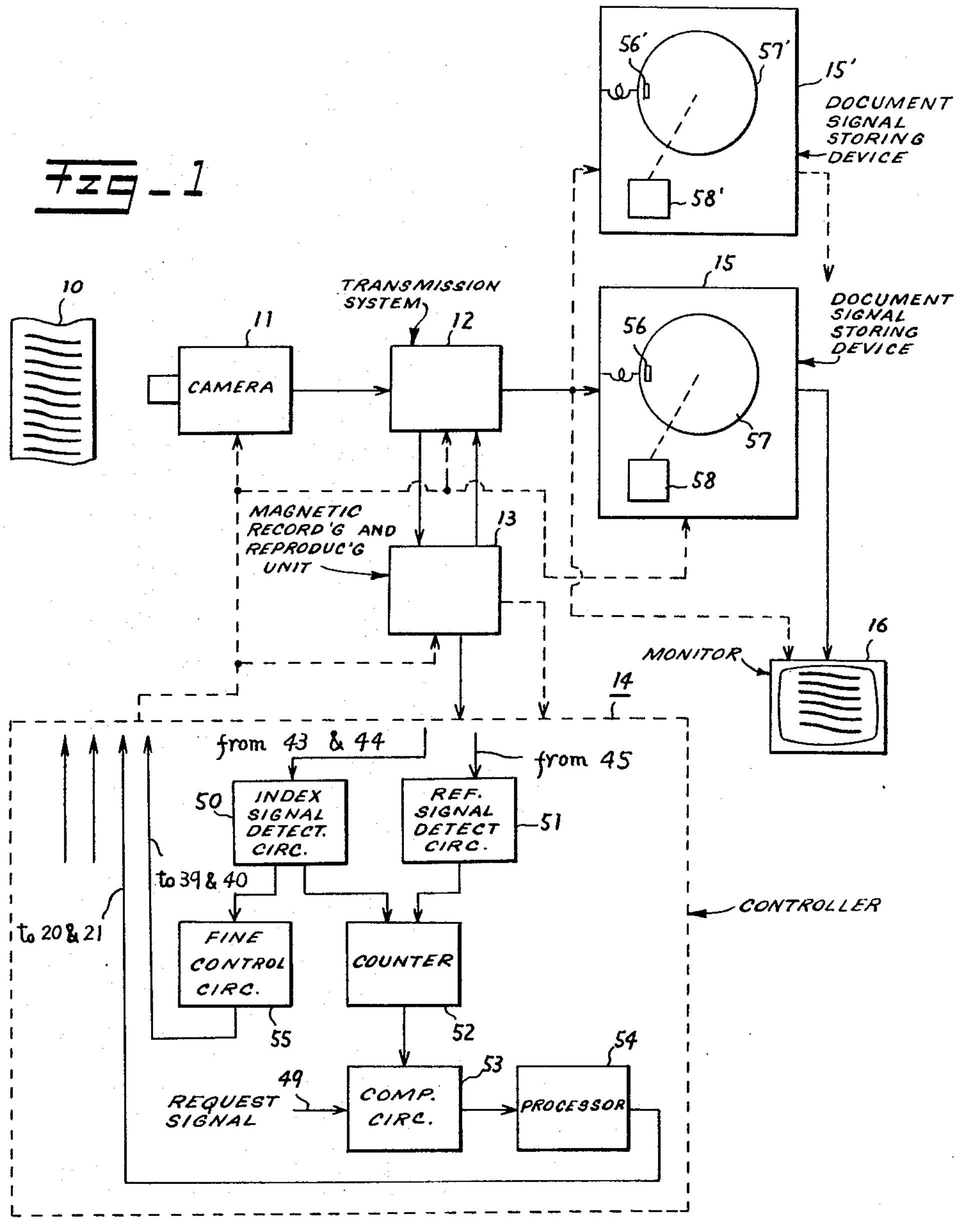
FIG. 1 is a block diagram illustrating the component parts of the data retrieval system of the present invention.

Referring now to the figures and particularly to the FIG. 1 there is illustrated in block form a data retrieval system for recording and reproducing, as an example, pages of a document or book, one of the pages of the document being identified by the numeral 10. It is to be understood however that the data retrieval system of the present invention can be used to record, retrieve and reproduce any type of information.

The data retrieval system of the present invention includes an image pick-up unit or television camera 11 for picking up the image of the document page 10, a transmission system 12 for transmitting the document signal from the image pick-up unit 11 to a magnetic recording and reproducing unit 13 which records the document signal transmitted by the transmission system 12, and controller unit 14 for controlling the various components of the data retrieval system of the present invention. If desired, a document signal storing device 15 may be provided for storing the document signal reproduced and a monitor 16 may be provided for viewing the reproduced information. In operation the controller unit 14 actuates the system and permits the image pick-up device 11 to scan the document page 10, the output of the image pick-up unit 11 being then fed to and recorded by the magnetic recording and reproducing unit 13. After retrieval the document page 10 can either be reviewed on a monitor 16 or can be stored in one or more document signal storing units 15 or 15'.

One specific embodiment of a magnetic recording and reproducing unit 13 will be described with reference to FIGS. 2 and 3.

Figure 2:
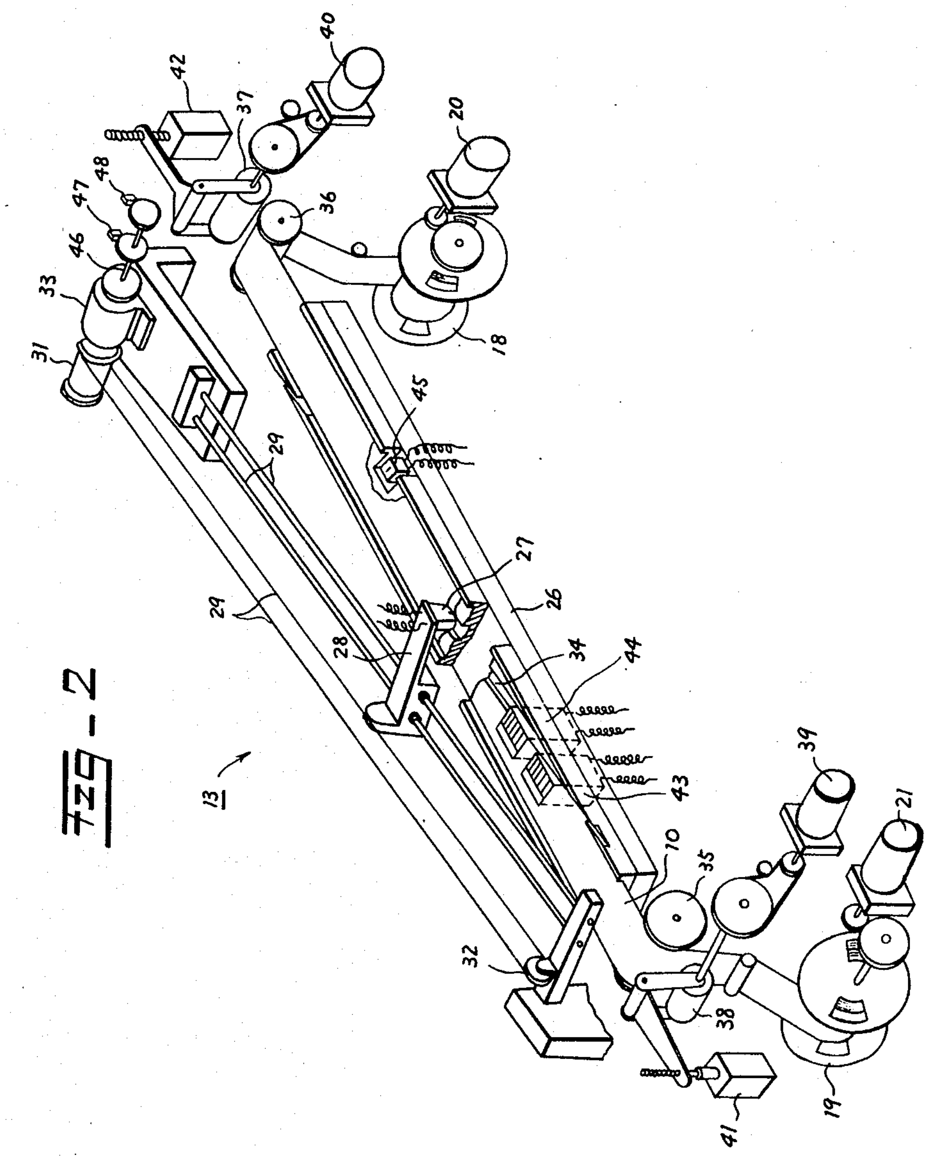
FIG. 2 is a perspective view of a portion of the data retrieval system of the present invention.

As illustrated in FIG. 2, the magnetic tape 17 is transported between reels 18 and 19 which are coupled respectively with motors 20 and 21. The magnetic tape 17 as illustrated in FIG. 3 has recorded at the beginning and end portions thereof a reference signal 22. A series of spaced index signals 23 is recorded at spaced intervals along the longitudinal length of the tape 17, the index signals 23 being recorded along an index signal track 24.

The index signal 23 is preferably a periodic signal such as a sine wave, a rectangular wave or a pulse wave. The recording of the index signal 23 is accomplished with high intensity in order not to be erased by the recording of the document signals 25 which will hereinafter be described in greater detail.

The index signal track 24 is located on a marginal portion of the tape 17 and extends longitudinally the length of the tape. If desired however the index signal track 24 may be located either centrally or at any other desired portion of the tape. The direction of magnetization by the index signal 23 may be in the longitudinal direction of the tape 17 but preferably in a direction across the document signal track 25 for a purpose to be presently described.

In the embodiment of the magnetic recording and reproducing unit 13 illustrated in FIG. 2 the tape 17 is transported by the reels 18 and 19 while the tape 17 is held in slight in contact with the upper surface of the tape guide member 26. A magnetic head 27, which forms the document signal track 25, is positioned to make contact with the magnetic tape 17 while reciprocating obliquely with respect to the longitudinal direction of the tape 17. The magnetic head 27 is mounted on a movable arm 28, the movable arm 28 being movable along a pair of guide rods 29 which are disposed obliquely with respect to longitudinal direction of movement of the magnetic tape 17. The moving arm 28 is coupled to a belt 29 which extends between pulleys 31 and 32, with the pulleys 31 and 32 being driven by a motor 33 which is connected to one of the pulleys. In order to ensure that the magnetic head 27 makes contact with the tape 17 at a suitable contact pressure a groove 34 is formed in the upper surface of the tape guide member 26 at a location corresponding to a locus of the movement of the magnetic head 27 on the tape 17.

In order to provide for instantaneous starting and stopping of the magnetic tape 17, rollers 35 and 36 are disposed at either end of the magnetic tape guide member 26 and adjacent to the reels 18 and 19. The rollers 35 and 36 are adapted to engage with driving rollers 37 and 38 which are coupled respectively with motors 39 and 40. The motors 39 and 40 are disposed in a close relationship to rollers 35 and 36 respectively with each of the driven rollers 37 and 38 being designed to engage with and disengage from the rollers 35 and 36, with the magnetic tape 17 being gripped between these rollers. The numerals 41 and 42 indicate plungers by means of which driving rollers 37 and 38 are engaged with and disengaged from rollers 35 and 36.

The index signals 23 are recorded on the magnetic tape 17 by means of a pair of flux-sensitive magnetic heads 43 and 44 which are preferably of the multi-gap type. These flux-sensitive heads 43 and 44 are mounted on the magnetic tape guide member 34 at locations corresponding to the positioning of the index of the signal track 24 on the magnetic tape 17. The magnetic flux-sensitive heads 43 and 44 are adapted to produce the index signals 23 which are displaced 90 degrees apart in phase. The flux heads 43 and 44 are preferably of the multi-gap type which are disclosed in FIG. 7 in my co-pending patent application Ser. No. 237,202. With the flux-sensitive magnetic head an output voltage can be obtained which is independent of tape speed. Accordingly, through the use of the magnetic flux heads 43 and 44 which are flux-sensitive and of multi-gap type construction a reproduced output of the index signal 23 is obtained which has a high, signal to noise ratio and drop out is avoided.

The reference signal 22, which is provided at the beginning and end of the magnetic tape 17 is in one form of the invention recorded on the magnetic tape 17 by means of the magnetic head 45. The magnetic head 45 is mounted on the guide member 26 at positions corresponding to the desired location of the references signal 22 on the magnetic tape 17.

Figure 3:
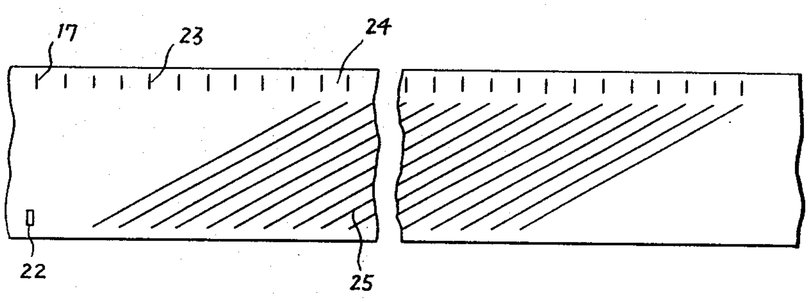
FIG. 3 is a front view of a portion of a piece of a magnetic tape which is used in conjunction with the data retrieval system of the present invention and illustrating in magnified form the tracks which are formed on the magnetic tape during the operation of the data retrieval system of the present invention.

With a system such as that described above the image output from the transmission system 12 is fed to the magnetic head 27 of the magnetic recording and reproducing device 13 and is recorded on a magnetic tape 17 in the form of skew tracks such as illustrated in FIG. 3. Each skew magnetic track or document signal 25 corresponds to one page of the document 10 which is to be recorded.

In the system illustrated it is to be noted that the magnetic tape 17 is stationary while the document signal 25 is being recorded thereon. The time required for recording the document signal 25 for each page of the document 10 can be programmed for one second or more by selecting the scanning period of one frame or field of image pick-up unit 11 to be one second or more. In this manner precise and complicated mechanisms can be dispensed with which are normally required for high speed driving of the magnetic head 27. In addition the relative speed of the head 27 to the magnetic tape 17 can be reduced so that wear on these two components of the system can be decreased.

It is to be understood that although there is illustrated in FIG. 2 one form of magnetic recording and reproducing device 13 that other types of magnetic recording and reproducing devices can be used. As an example, a conventional video tape recorder using rotating heads can be used in place of the magnetic recording and reproducing device illustrated in FIG. 2. In such event, the magnetic tape 17 is moving while the head 27 is recording thereon the document signal 25.

The controller unit 14 controls the motors 19, 20, 39 and 40 which stops and starts the magnetic tape 17, controls the motor 33 which drives the magnetic head 27, and determines the scanning period for the image pick-up unit 11. In order to synchronize the scanning of the magnetic head 23 with that of the image pick-up unit 11 to produce a document signal 25, there is provided on the rotary shaft 46 of the magnetic head driving motor 33 pulse generators 46 and 47. The pulse generator 47 produces a synchronizing pulse corresponding to a vertical synchronizing signal while the pulse generator 48 produces a synchronizing pulse corresponding to horizontal synchronizing signal. The synchronizing signals from the two pulse generators 47 and 48 are fed by the control unit 14 to the image pick-up unit 11 to thereby control the operation of the image pick-up unit. It can therefore be seen that each recorded document signal 25 corresponds to a page 10 of the document which is to be produced. The particular page of the document 10 is indicated by the number of index signal 23 counted from the reference signal 22.

When it is desired to reproduce the particular recorded document page 10 a request signal 49 is applied to the controller unit 14, the request signal 49 corresponding to the page number of the document 10 which it is desired to reproduce. The number of the request signal 49 is then compared with that of the index signals 23 obtained by the magnetic heads 43 and 44. When the request signal number 49 compares with the index signal 23 the magnetic tape 17 is stopped, the track is scanned and the signal reproduced. These functions are all accomplished by the controller unit 14.

The controller unit 14 is comprised of an index signal detecting circuit 50 which detects outputs from the magnetic heads 43 and 44, a reference signal detecting circuit 51 which detects the output from magnetic head 45, a counter 52 which is activated by the output of the detecting circuit 51 and which counts the output pulses from the index signal detecting circuit 50, a comparator circuit 53 which compares the output from the counter 52 with the request signal 49 and a processor 54 which processes the output from the comparator unit 53.

The reel motors 20 and 21 are controlled by the output from the comparator 53 in order to drive the tape 17 until the tape 17 reaches a position, where the request signal 49 agrees with the measured value of the counter 52. When this occurs the magnetic tape 17 stops and the magnetic head 27 scans a particular document signal track 25 which corresponds to the number of the document requested by the request signal 49. One portion of the output from the index signal detecting circuit 50 is also fed to a fine control circuit 55 which finely controls the position of the track 25 to be scanned by the magnetic head 27. The output of the fine control circuit 55 is fed to motors 39 and 40 which are coupled to driving rollers 37 and 38, respectively, which operate, as previously described, to provide for instantaneous starting and stopping of the magnetic tape 17, thereby finely positioning the track 25 to be scanned due to the instantaneous stop capability resulting from the action of the rollers 35 and 36, adjacent to the reels 18 and 19, in cooperation with the driving rollers 37 and 38.

If the zero level of the index signal 23, which is a sine wave, is selected to agree with the magnetic track 25, the point of intersection of the zero level of the index signal 23 with that of the request signal 49, which is also a sine wave, is detected in a processing unit 54 and is controlled by this detected output. In this manner, the motors 39 and 40 are controlled by the output from the processor 54 with the result that the magnetic head 27 accurately scans a particular magnetic document signal track 25 corresponding exactly with the pre-selected number.

When the tape 17 has been stopped in the desired position, the motor 33 is activated by the controller unit 14 in order to permit the magnetic head 27 to scan the particular document signal track 25 corresponding to the page selected and reproduced therefrom the desired signal. The reproduced signal can either be displayed on the monitor 16 or if preferred can be fed to the document signal storing devices 15. It is to be understood that more than one document signal storing devices 15 can be provided, such for example as the unit 15'. In this manner a plurality of persons can for example each receive individual instruction.

The document signal storing device 15 illustrated in FIG. 1 includes a magnetic head 56 which is disposed in contact with a rotary magnetic sheet 57. The magnetic sheet 57 is rotated by a motor 58 which is controlled by the controller unit 14. The desired document signal 25 is accordingly magnetically recorded on the sheet 57, one page or document 10 being recorded in the form of a continuous annular track on the sheet 57. The document signal storing device is preferably so designed that the magnetic head 56 can continually scan the same annular track on the sheet 57 in order to thereby produce for visual examination the desired document page 10. In this manner, the desired document page 10 can be continuously reviewed on the monitor 16.

If a conventional video tape recorder is used, the document signal storing device can of course be dispensed with and the document page can be reviewed directly on the monitor 16. In the embodiment of the invention illustrated in FIG. 2, however, the head 27 is not designed to continually scan the same document signal track 25 and therefore with the unit such as illustrated in FIG. 2 continuous scanning is not provided so that direct viewing on the monitor 16 is not possible. Accordingly with the unit such as that illustrated in FIG. 2 the document signal 25 after being reproduced is stored in the document signal storing unit 15 from whence it can be continuously reproduced and reviewed on the monitor 16. The monitor 16 can of course be in the form of a usual television receiver and in one embodiment of the invention the desired document page 10 can either be reviewed directly on the monitor 16 or in the form of the invention illustrated in FIG. 2 the document page 10 is first recorded in the document signal storing device 15 and then is continuously displayed on the monitor 16.

As described previously a reference signal 22 is in some way applied to the beginning and end of each tape 17. A plurality of index signals 23 is positioned at equally spaced positions along the index signal track 24 which extends from the beginning to the end of the tape 17 between the reference signals 22 at the beginning and end of the tape. These index signals 23 are all identical and the position of a given document page 10 is determined or identified by counting the number of index signals 23 from either the beginning or end of tape 17. Since each document signal 25 has identified therewith an index signal 23, a particular document requesting signal 49 will identify a particular document signal 25 and its corresponding index signal 23. This operation is accomplished by means of an index signal detecting circuit 50 which positions the magnetic head 27 on the desired document signal track 25 specified by the request signal 49.

As described previously the reproduction of a particular index signal 23 requires the use of the flux-sensitive magnetic heads 43 and 44, and further that these magnetic heads be so disposed as to reproduce the index signals 23 which are displaced one quarter wave length apart in phase, i.e. one quarter of the wave length of the index signal 23. As a result of this the magnetic heads 43 and 44 respectively produce the signal 59 and 60 illustrated in FIGS. 5A and 5B. The equation for the signal 59 is $$\sin 2\pi\frac{x}{\lambda}$$

and the equation for the signal 60 is $$\cos 2\pi\frac{x}{\lambda}$$

where $x$ represents distance in the lengthwise direction of the magnetic tape 17.

Figure 4:
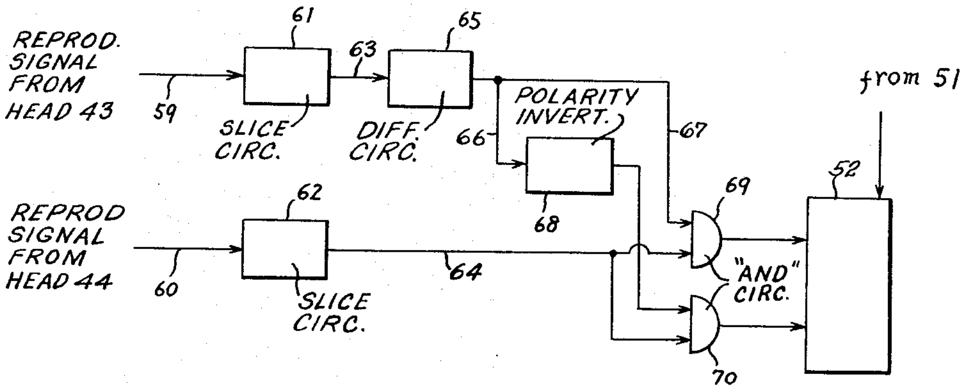
FIG. 4 is a block diagram illustrating the index signal detector circuit of the present invention.
Figure 5:
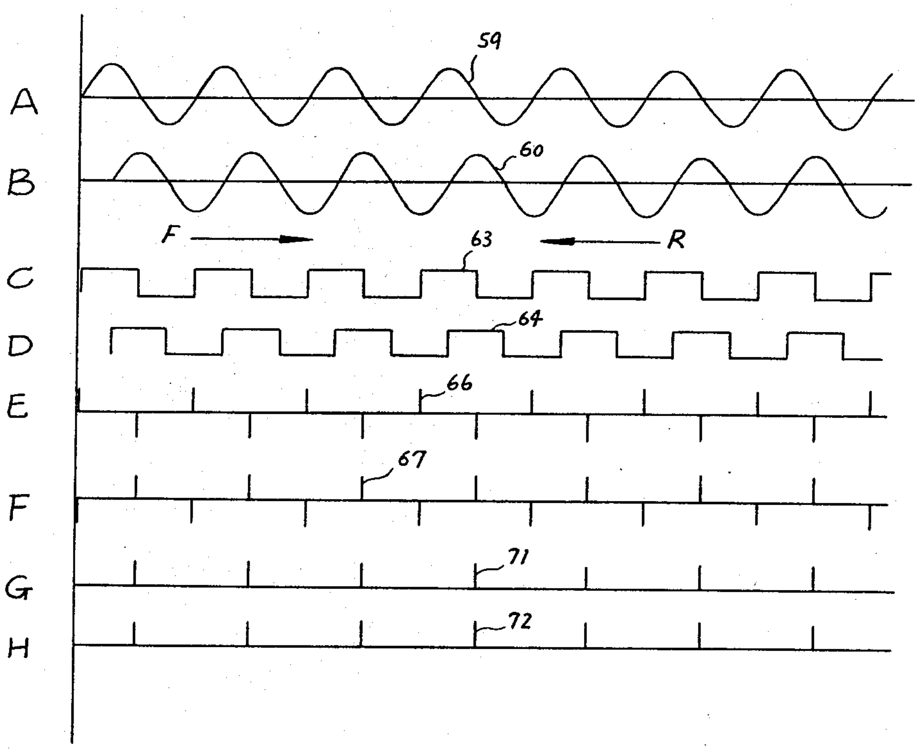
FIG. 5 illustrates the wave forms which appear at different portions of the data retrieval system of the present invention.

The signals 59 and 60 which are obtained from the magnetic heads 43 and 44 are applied to the slice circuits 61 and 62 which produce output rectangular waves 63 and 64 such as depicted in FIGS. 5C and 5D. As illustrated in FIG. 4 the rectangular wave 63 is fed to a differentiation circuit 65 which produces differential pulses 66 or 67, such as depicted in FIGS. 5E and 5F, depending upon the direction or movement of tape 17. The differentiation circuit 65 has an output waveform, which may be either as shown in FIG. 5E or FIG. 5F, which is the time derivative of the input waveform and is proportional to the rate of change of the input waveform. Therefore, if the tape 17 is moving in a direction, such as the forward direction represented by the arrow labeled F in FIG. 5C, with FIG. 5C the input waveform to the differentiation circuit 65, then the output waveform of FIG. 5E is produced due to the direction of the rate of change of the rectangular waveform of FIG. 5C. If the tape 17 is moving in the opposite direction, represented by the arrow labeled R in FIG. 5C, with FIG. 5C again the input waveform to the differentiation circuit 65, then the output waveform of FIG. 5F is produced, which is inverted as compared to the waveform of FIG. 5E due to a reversal in the direction of the rate of change of the rectangular waveform of FIG. 5C. The pulse 66 is applied to an "and" circuit 69 which also has applied thereto the rectangular wave 64. When the direction of movement of tape 17 is reversed, as indicated by the arrow R in FIG. 5C, the other pulse 67 is produced and is fed to another "and" circuit 70 through a polarity-invertor 68. The "and" circuits 69 and 70 produce outputs which are directly proportional to and in a response to the direction of movement of the magnetic tape 17. That is the signals 63 and 64 are not related to the direction of movement of the tape 17 but differentiation introduces a function of time which results in the production of the signals 66 and 67, the particular signal produced being dependent on the particular direction of travel of the tape 17. Accordingly when a tape 17 travels in a forward direction the "and" circuit 69 provides a pulse 71 such as shown in FIG. 5G, when both rectangular wave 64 and pulse 66 are present and when the tape 17 travels in an opposite direction the "and" circuit 70 provides the pulse 72 such as illustrated in FIG. 5H when both rectangular wave 64 and pulse 67 are present. The "and" circuits 69 and 70 are therefore operated in accordance with the direction of the tape 17 "and" circuit 69 being operated when the tape 17 travels in the forward direction, and "and" circuit 70 being operated when the tape 17 travels in the opposite direction.

The counter 52 is constructed to be of the reversible type and therefore performs the function of addition when activated by the pulse 71 and subtraction when activated by the pulse 72. With such a system therefore the position of the tape 17 is determined independently of its direction of travel. In this manner it is not necessary to return the tape to its beginning point in order to locate a different document signal 25. If the tape has traveled past its mid-point rather than being returned to the beginning it is returned to the opposite end and counting proceeds from the point.

Figure 6:
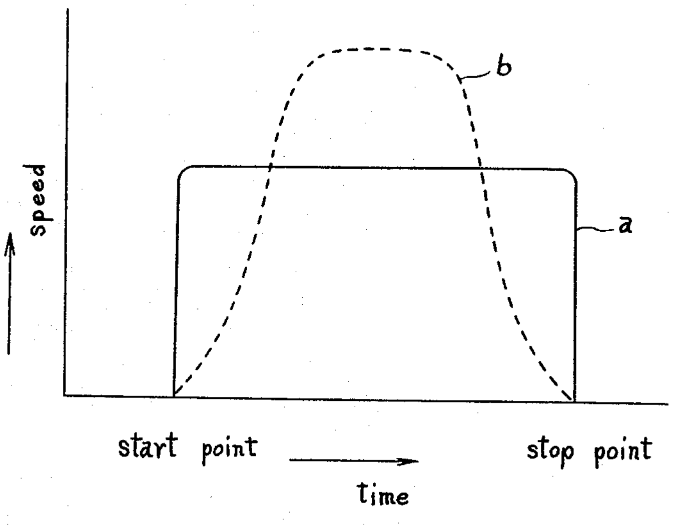
FIG. 6 is a speed characteristic curve of the magnetic tape utilized in conjunction with the data retrieval system of the present invention.

In the practice of the present invention it is of course necessary that the tape 17 be stopped when the request signal 49 agrees with a particular index signal 23, this function being determined by the comparator circuit 53. It has here-to-fore been the customary practice to start the magnetic tape at high speed and to stop it rapidly at the desired index signal 23. This type of operation is indicated by the curve *a* in FIG. 6. In the present invention however the use of the flux-sensitive magnetic heads 43 and 44 disposes with the need for such sudden starting and stopping of the tape 17. Through the use of the present invention even if the magnetic tape is not driven with rapid starts and stops but at constant speed signals can still be obtained that do not contain any output variations, i.e. no output variations are produced during the time that the tape is stationary. Through the use of the present invention it is accordingly possible to gradually increase the speed of the tape 17 and to gradually bring the tape to a stop as indicated by the curve *b* in FIG. 6. The use of such a tape speed charactristic simplifies the construction of the tape driving mechanism. In the present invention therefore the output of the comparator 53 is a comparison of the output from the counter 52 with the request signal 49, the output of the comparator 53 being applied to the processing circuit 54. The output of the processor 54 provides the speed characteristic indicated by the letter *b* in FIG. 6. This information of course includes the initial difference between the index signal count 23 and the request signal 49 in order to determine at what position the tape 17 should be stopped. It is of course to be understood that such processing can also be accomplished by preliminary programming.

The use of the present invention also permits the removal of a particular documents signal 25 and the recording of a different document signal. This is accomplished by providing the magnetic head 27 with only a carrier while it is being moved over an undesired document signal 25 which results in erasing the signal previously recorded. The magnetic head 27 then traverses the same track and records thereon a new document signal.

What has been described in a data retrieval system which is inexpensive to manufacture and which is simple and convenient to operate. It is to be understood that although a preferred embodiment of the invention has been illustrated and described that many modifications and variations may be made without departing from the scope of the present invention except as limited by the appended claims.

What is claimed is:

1. In a data recording and retrieval system, the combination of a magnetic recording tape having data signals recorded in respective tracks extending obliquely to the longitudinal direction of the tape, reference signals at widely spaced locations along the tape so as to encompass a large number of said tracks therebetween and identical repetitive index signals recorded on said tape for each of said tracks at locations corresponding to the respective tracks, transducer means for scanning and reproducing the data recorded in any of said tracks when said track is situated at the site of said transducer means, reversible drive means for moving said tape longitudinally past said transducer means in either direction, first and second index signal reproducing heads spaced from each other in the direction of movement of the tape and positioned to reproduce said index signals out-of-phase upon movement of the tape longitudinally therepast, reference signal detecting means to detect each of said reference signals, counting means activated by said reference signal detecting means, means causing said counting means to count in response to said out-of-phase index signals reproduced by said first and second heads with the direction of said counting being determined by the direction of movement of the tape, and control means to cause operation of said drive means in a selected direction and including comparator means supplied with a request signal corresponding to the track containing data to be reproduced and comparing said request signal with the output of said counting means to halt the operation of said drive means when said output and the request signal correspond.

2. In a data recording and retrieval system, the combination according to claim 1, in which said means causing said counting means to count includes differentiating means operated by the output of one of said index signal reproducing heads to provide signals characteristic of the direction of movement of the tape, and means combining said signals characteristic of the direction of movement of the tape with the output of the other of said index signal reproducing heads to control both the count and direction of count of said counting means.

3. In a data recording and retrieval system, the combination according to claim 1, in which said index signals are of sine-wave configuration and said index signal reproducing heads are flux-sensitive so that their output voltages are determined by said index signals rather than by tape speed, and fine tape drive means are provided to adjust the position of the tape relative to said transducer means until the zero output is obtained from one of said index signal reproducing heads after the operation of the first mentioned drive means has been halted.

References Cited

UNITED STATES PATENTS

| | | |
|---|---|---|
| 3,084,215 | 4/1963 | Bounsall. |
| 3,258,754 | 6/1966 | Gabor. |
| 3,051,777 | 8/1962 | Lemelson. |
| 3,180,930 | 4/1965 | Bounsall. |
| 3,372,242 | 3/1968 | Garrett. |
| 3,123,668 | 3/1964 | Silva. |

ROBERT L. GRIFFIN, Primary Examiner

D. E. STOUT, Assistant Examiner

U.S. Cl. X.R.

179—100.2